United States Patent

[11] 3,612,335

[72] Inventor Peter T. Schurman
 Woodbridge, Conn.
[21] Appl. No. 793,499
[22] Filed Jan. 23, 1969
[45] Patented Oct. 12, 1971
[73] Assignee The Plastic Forming Company, Inc.
 Woodbridge, Conn.

[54] CONTAINER
 10 Claims, 6 Drawing Figs.
[52] U.S. Cl. .................................................. 220/16,
 206/45.34, 220/31 S, 220/82 R, 220/55 K
[51] Int. Cl. ......................................................... B65d 25/00
[50] Field of Search ............................................ 220/9, 9 F,
 16, 31 SR, 82; 206/45.34

[56] References Cited
 UNITED STATES PATENTS
2,123,023 7/1938 Pilliod et al. .................. 206/45.34 UX
2,393,568 1/1946 Root ............................. 220/31 (SR) X
2,489,525 11/1949 Crane ........................... 220/31 (SR) X
2,735,542 2/1956 Shnitzler ...................... 220/31 (SR) X
2,736,452 2/1956 Roop ............................ 220/31 (SR) X
3,315,796 4/1967 Dreyfuss ...................... 220/31 (SR) X
3,339,781 9/1967 Schurman et al. ............ 220/9
 FOREIGN PATENTS
1,482,054 4/1967 France ......................... 220/31 (SR)

Primary Examiner—Joseph R. Leclair
Assistant Examiner—James R. Garrett
Attorney—Christel & Bean ABSTRACT: A plastic container having a blow-molded body and a movable cover member injection molded of a clear plastic material. The movable cover member extends between a pair of end caps formed with the body as an integral part thereof, the end caps being located adjacent the opposite ends of the cover to complete the cover portion of the container. Hinge pins formed as part of the movable cover member engage openings in the end caps, and a latch carried by the cover member has locking engagement with the body.

INVENTOR.
Peter T. Schurman
BY
Christel & Bean
ATTORNEYS.

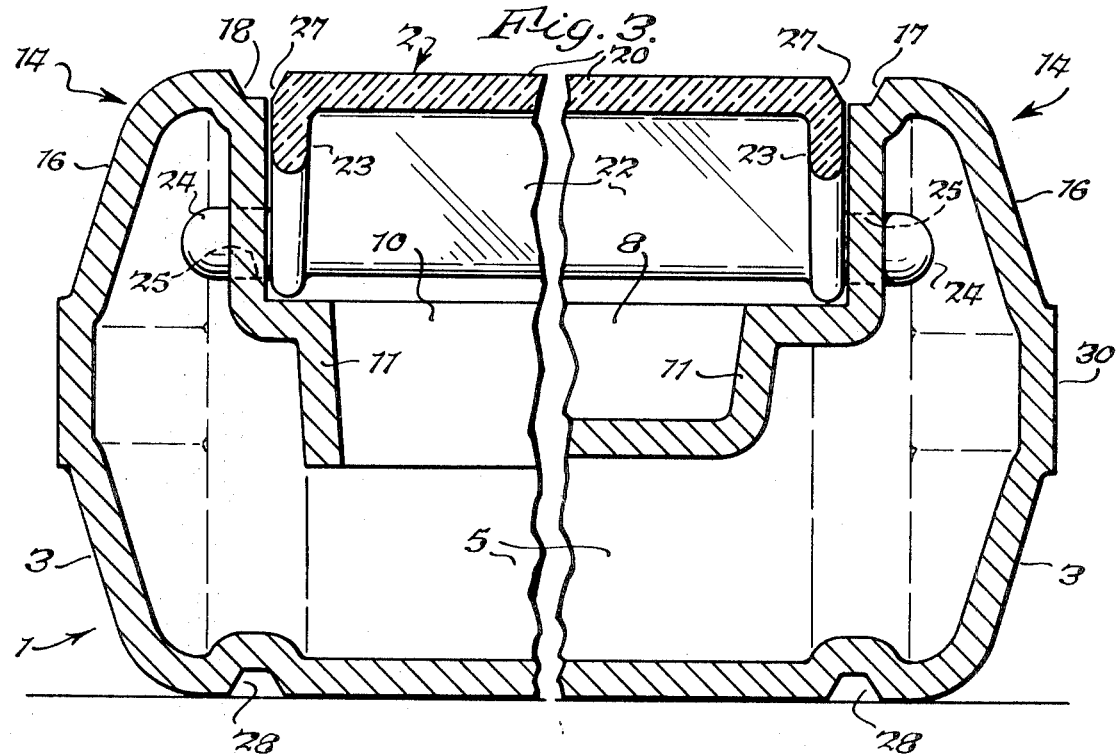
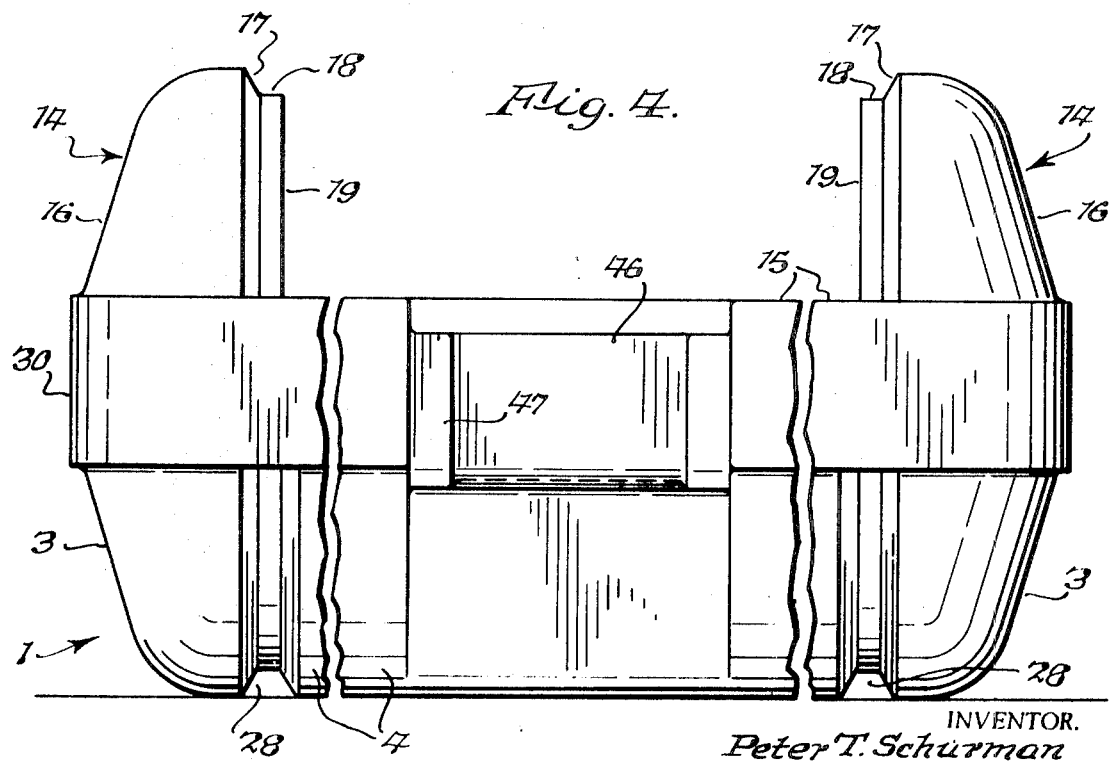

3,612,335

1

CONTAINER

BACKGROUND OF THE INVENTION

This invention relates generally to the container art, and more specifically to a new and useful plastic container having a cover adapted to be made in part of a transparent material.

The provision of transparency, enabling one to see into or through a closed container, is highly desirable from the merchandising point of view. It permits a prospective purchaser to see what he is buying without opening the container, and permits the merchant to display the product with the container closed instead of open, thereby conserving display space and the labor cost of preparing and maintaining a display.

Previously, transparency customarily was provided in plastic containers by injection molding the entire cover, and sometimes also the base, of a clear plastic material. While satisfactory for many purposes, this practice poses problems. For example, if expense is a limiting factor, styrene must be used to achieve transparency. However, styrene is brittle and therefore not acceptable as a cover material in many instances. Cellulose acetate is clear, but it also is expensive, only semirigid and embrittles on aging making it generally unsuited for container covers made in this manner. Other clear plastic materials are available but, like acetate, are relatively expensive compared to styrene.

Also, where it is desired to provide a line of containers in a variety of sizes, the tooling for such injection molded covers is prohibitively costly.

In my pending application Ser. No. 741,368 filed July 1, 1968, now U.S. Pat. No. 3,524,564 issued Aug. 18, 1970, there is disclosed a plastic container having a transparent cover which can be formed relatively inexpensively and without the objectionable brittleness previously noted. In the preferred form of that invention blow molding and injection molding are combined in a manner utilizing the former to provide a compartmented, cushioned base and the latter to provide transparency in the cover. Specifically, there is provided a composite cover having a center portion which can be extruded but preferably is injection molded of a clear plastic material, and which is secured to a pair of end cap members which also are injection molded and which need not be clear and therefore can be formed of other plastic materials having greater impact strength than the material of the center portion.

The container of my earlier invention offers numerous advantages and is considered to be highly desirable for many purposes. In addition to transparency it possesses a substantial decorative potential and offers excellent display even on deeper boxes. It also offers a considerable amount of design freedom. Where these features are required, or desired, the cost of injection molding the end caps and assembling them to the center portion is not a limiting factor.

However, there are situations where it is desired to provide transparency in the cover, and where relative cost is a more limiting factor than flexibility and freedom in design.

SUMMARY OF THE INVENTION

Accordingly, the primary object of this invention is to provide a container retaining the advantages of my earlier invention insofar as transparency is concerned, but in a simpler and relatively less expensive construction.

Another object of my invention is to provide the foregoing in a container possessing substantial decorative and display potential.

In the preferred form of this invention, blow molding and injection molding are again combined in a manner utilizing the former to provide a compartmented base and the latter to provide transparency in the cover, but in a construction which is less expensive than that of my pending application.

A characterizing feature of this invention lies in the provision of end cap members which compliment and complete a movable cover member preferably molded of clear plastic material, which end cap members are blow molded as an integral part of the container body.

The foregoing and other objects, advantages and characterizing features of this invention will become apparent from the ensuing detailed description of an illustrative embodiment thereof, reference being made to the accompanying drawings depicting the same wherein like reference numerals denote like parts throughout the various views.

BRIEF DESCRIPTION OF THE DRAWING FIGURES

FIG. 3 is a sectional view thereof taken about on line 3—3 of FIG. 2, on an enlarged scale and with parts broken away for convenience in illustration;

FIG. 4 is a front elevational view of the container body portion, showing the integral end caps but with the handle and movable cover member removed, also on an enlarged scale and with parts broken away for convenience in illustration;

DESCRIPTION OF THE ILLUSTRATED EMBODIMENT

Figure 1:
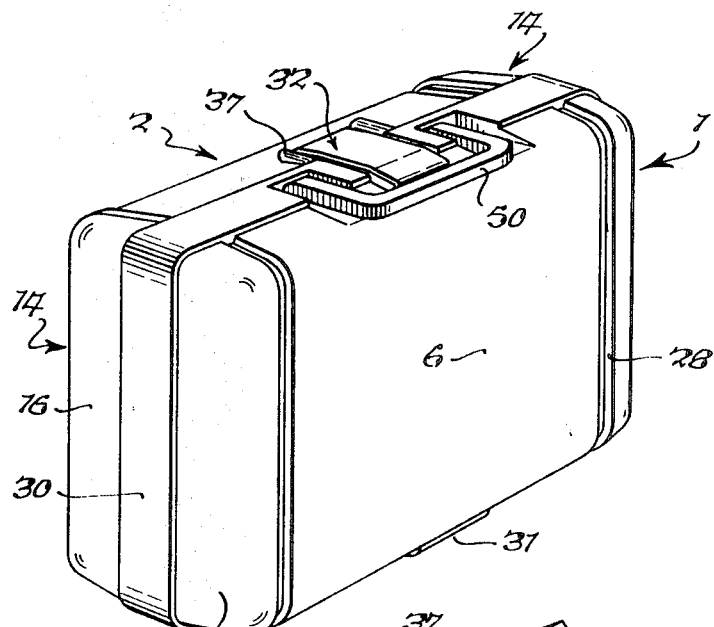
FIG. 1 is a perspective view of a container incorporating the instant invention, shown in closed position.

The illustrative container depicted in the accompanying drawings comprises a base or body, generally designated 1, and a cover generally designated 2. Body 1 is a hollow, double wall construction formed by an outer shell having end walls 3, a front wall 4, a rear wall 5 and a bottom wall 6 and an inner shell extending across the outer shell and formed to provide, in the illustrated embodiment, compartments 7, 8, 9 and 10. These various compartments 7, 8 and 9 are closed by bottom walls 12. As will be understood by those versed in the blow molding art, compartment 10 also was formed with a bottom wall, but the same has been cut away to provide access to the interior of body 1 between the inner and outer shells, for storage or any other purpose.

As in my earlier application, the container of this invention has a cover portion comprising a hinged cover member and a pair of end caps. However, unlike my earlier invention wherein the end caps are separately molded and attached to a center channel to complete the cover, it is a particular feature of the instant invention that the end caps are formed with body 1 as an integral part thereof.

Figure 2:
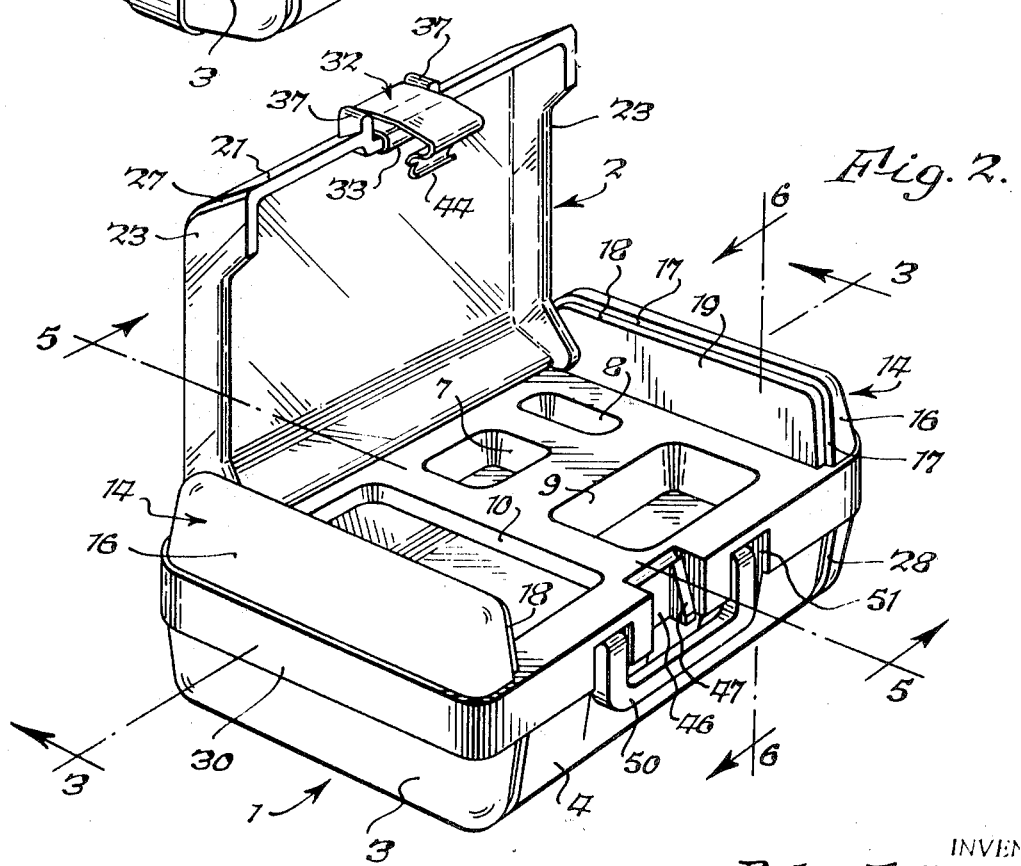
FIG. 2 is a perspective view thereof in open position.

To this end, body 1 is formed to provide end caps, generally designated 14, which extend upwardly above the parting line of the container as defined by the ledge 15 around compartments 7–10 comprising the outer perimeter of the inner shell of the body. Each end cap 14 is hollow, opening downwardly into the hollow interior of body 1, being formed to provide a sidewall portion 16 extending across the corresponding end of body 1 and around the front and rear thereof, and also across the top of the end cap, as shown in the drawings. An inclined shoulder 17 extends across the top and downwardly along the opposite side edges of wall portion 16, leading to a step 18 extending horizontally across the top and downwardly along the opposite sides of wall portion 16 as viewed in FIG. 2, but in inwardly offset relation thereto. A vertical inner wall 19 extends across end cap 14 between step 18 and shelf 15 whereby end caps 14, like the remainder of body 1 is of hollow, double walled construction.

In the illustrated embodiment, cover 2 comprises a center member which is injection molded, preferably of clear plastic material such as styrene, to provide a top wall 20 and inclined front and rear walls 21 and 22, respectively. While cover member 2 could be of simple channel shape, and extruded, with a separate hinge attached thereto, I prefer to close the opposite ends of the cover channel with sidewall skirts 23 which extend completely across cover part 2 from front wall 21 to rear wall 22, being molded integrally with the wall parts 20, 21 and 22 and thereby strengthening cover member 2 by making it more rigid and less subject to bending. This is important, particularly with relatively brittle materials such as styrene.

A pair of laterally outwardly directed hinge pins 24 are formed integrally with cover 2 on the rear portion of skirts 23, being received in openings 25 cutout of the inner sidewalls 19 of the end caps 14. Hinge pins 24 and openings 25 are so located and arranged, relative to the lower ends of cover skirts 23 and rear wall 22, and the horizontal ledge 15 around body 1, as to permit cover member 2 to be swung rearwardly to the position shown in FIG. 2 where it has moved through and beyond a right angle with rear wall 22 resting on ledge 15.

It will be appreciated that hinge pins 24 can have a configuration other than that shown. Also, while a hinged cover customarily will be provided, hinge pins 24 can be omitted, along with the openings 25, where a simple, lift-off type of cover is desired.

The edge between skirts 23 and wall portions 20, 21 and 22 is beveled, as indicated at 27, the beveled edges 27 complimenting the inclined shoulders 17 of end caps 14 although the front and rear portions of the former are inwardly offset relative to the corresponding portions of the latter.

The provision of inclined surfaces 17, 27 leading to the inwardly offset joint between cover member 2 and end caps 14 tends to conceal any misfit or misalignment between the hinged cover part 2 and the remainder of the container. At the same time, it makes for easier blow molding of end caps 14 with body 1. In addition, this inwardly offset joint arrangement provides a decorative appearance, and body 1 can be provided with matching channels 28 having diverging sidewalls and extending across the bottom and upwardly along the front and rear of the base, in vertical alignment with the cover joints.

The outer shell of body 1 also can be formed to provide an outwardly offset band 30 extending horizontally around the body 1 immediately below the parting line of the box as defined by ledge 15. In addition to the ornamental effect thereby produced, band 30 cooperates with a foot 31 formed as an integral part of the body rear wall 5. Foot 31 defined, with band 30 a stable support for the container in an upright position as illustrated in FIG. 1.

A variety of latching devices can be used to hold the hinged cover in closed position. The illustrated latch is relatively simple and inexpensive, while being ornamental in appearance and dependable in use. Latch 32 comprises an elongated strip of spring metal having a reverse bent, generally U-shaped anchoring attachment 33 at its upper end, which anchoring attachment is adapted to slip-fit over an inwardly offset portion 34 of cover front wall 21, which portion extends generally normal to top wall 20. One or more barbs 35 can be provided on the terminal leg of anchor portion 33 to bit into the cover material and thereby securely retain latch 32 in position, the extremity of the terminal leg being out turned to facilitate assembly of latch part 33 on cover portion 34.

The latch material is reversely bent to provide a downwardly opening, U-shaped portion 36 positioned between bosses 37 molded as part of cover member 2, the outer leg of portion 36 being extended and shaped to provide an elongated, slightly bowed face portion 39 terminating at its lower end in an upwardly facing, U-shaped latching portion 40. The inner leg of portion 40 extends at a relatively sharp angle, terminating in a tongue 42 of reduced width providing shoulders 43 for a purpose to be described, the tongue 42 terminating in a relatively flatly angled or reversely bent tip 44.

Tip end 44 snaps into place behind a downwardly projecting shoulder 45 formed at the bottom of an inwardly offset portion 46 molded in front wall 4 of body 1 and extending downwardly from ledge 15. Inclined cam surfaces 47 are molded on opposite sides of recessed face 46, and are engaged by shoulders 43 as cover member 2 is closed to cam latch tongue 42 outwardly, out of engagement with surface 46, until tip 44 is in position to snap into engagement behind shoulder 45. Tongue 42 extends between cam bosses 47.

By providing a latch camming part in the form of shoulders 43, separate from the latch locking part 44, these parts can be angled differently for optimum performance in their intended function, namely camming on the one hand and latching engagement on the other.

A handle 50 also is provided, in the form of a generally U-shaped member the legs of which are received in downwardly opening notches 51 molded into the front face 4 of body 1. Inwardly directed hinge pins 52 are molded on the handle legs, and engage within openings formed in the inner sidewalls of notches 51, the notches being wide enough to permit the handle legs to be spread apart for inserting the handle hinge pins in their respective openings.

Figure 5:
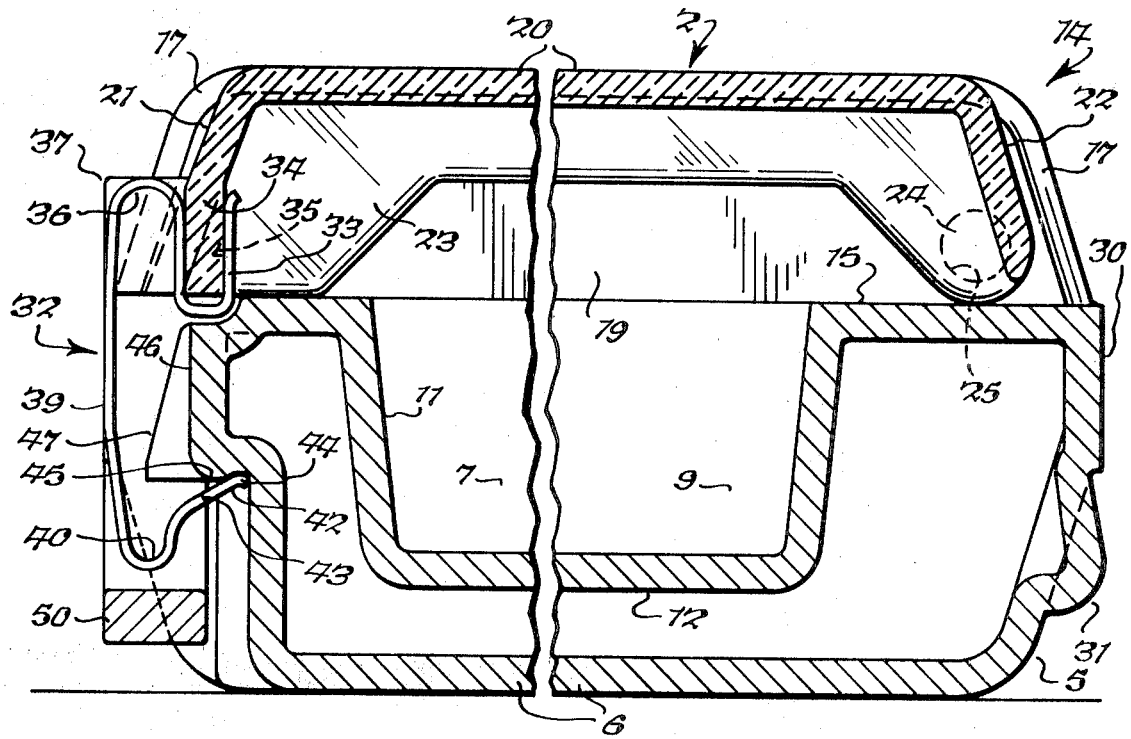
FIG. 5 is a sectional view thereof taken about on line 5—5 of FIG. 2, on an enlarged scale and with the movable cover member closed, parts being broken away for convenience in illustration.
Figure 6:
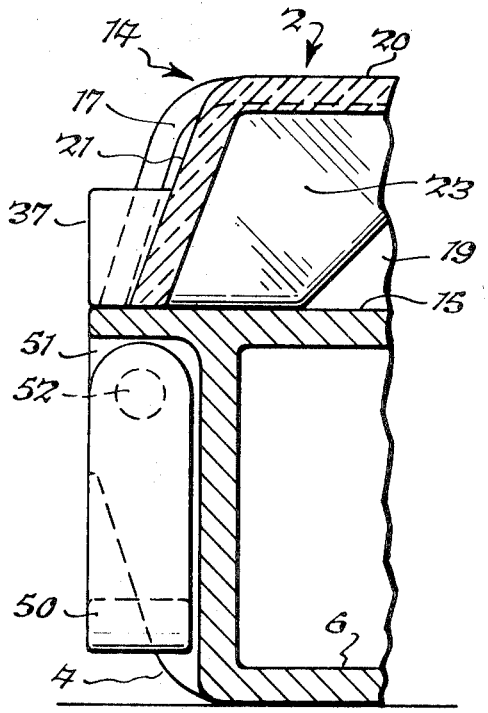
FIG. 6 is a fragmentary sectional view thereof showing details of the handle, taken about on line 6—6 of FIG. 2 on an enlarged scale and with the movable cover member closed.

While the hinged cover member 2 need not be transparent, and indeed need not even be made of plastic material, it is a particular feature of my invention that a see-through cover can be provided by making member 2 of a clear plastic material. At the same time, the provision of separate end caps, complimenting cover member 2 and completing the cover portion, permits the utilization therein of a material different from the material of cover part 2. As a result, the material of cover part 2 can be selected on the basis of cost and clarity, and even where that material is brittle, as in the case of styrene, it does not pose the problem which it would if the entire cover portion were made of that material because end cap portions 14 can be formed of a much stronger and less brittle material such as polyethylene. End caps 14 are more apt to be hit or struck than member 2, because of their location and arrangement, it being noted that in the illustrated embodiment the front and rear wall portions of cover member 2 are inwardly offset relative to the corresponding portions of end caps 14, as clearly shown in FIG. 5. Top wall 20 of cover member 2 is flush with the tops of end caps 14, although it, too, could be inwardly offset.

The opaque nature of the material used in end caps 14 does not detract from the transparency provided by cover part 2 which comprises the major portion of the cover and provides transparency from above as well as from front and rear. Indeed, end caps 14 delineate and enchance the window effect of member 2, and the composite nature of the container cover portion comprising member 2 and end caps 14 permits decorative effects and design treatments not possible with a one-piece molded cover.

Member 2 can be extruded or otherwise formed, if skirts 23 are omitted. However, for maximum clarity free of blushing and for maximum resistance to bending, it is presently contemplated that member 2 will be injection molded and will have end skirts 23 and will be injection molded. In addition to styrene, other plastic material such as XT polymer, acetate, polycarbonate, polyvinyl chloride and acrylic can be used in forming member 2.

Body part 1 including end caps 14 can be conveniently blow molded of polyethylene, polypropylene, polyvinyl or any other suitable thermoplastic material, using known blow molding techniques, and can be formed to provide compartments of any desired configuration in the inner shell. Being molded as a unit separate from the hinged cover member, body 1 can be formed relatively inexpensively and can be made to provide a wide variety of compartment shapes and sizes. In addition to such compartmenting of the body, the utilization of a blow-molded construction cushions the contents of the body because of the double wall construction that is provided. Such cushioning also is provided in the end caps, protecting the more brittle member 2.

Of course, it will be appreciated that my invention is not limited to the use of the foregoing materials which are listed by way of example.

The provision of a separate cover member 2 subsequently joined to the body means that body 1 can be packed and even shrink-wrapped prior to assembly of cover member 2 thereon.

The vertical walls 19 of end caps 14 will yield to permit insertion of the cover hinge pins 24.

While walls 20, 21 and 22 of cover member 2 are shown as being flat, they could be curved and if desired could comprise arcs of a common circle in cross section. Also, cover member 2 can be adapted to receive and retain a display card, as pointed out in my copending application.

Accordingly, it is seen that my invention fully accomplishes its intended objects. The advantages associated with a blow-molded body are provided, in the cover portion end caps as well as in the body, while also providing transparency in the cover in an arrangement permitting use of relatively inexpensive materials. It will be appreciated that the foregoing detailed description of a selected embodiment is given by way of illustration only, without though of limitation.

What I claim is:

1. A container comprising a body portion of thermoplastic material, a cover portion including a movable cover member extending lengthwise of said cover portion and terminating short of the opposite ends thereof, and a pair of end caps formed with said body portion as an integral part thereof, said end caps being located adjacent the opposite ends of said cover member to complete said cover portion, wherein said body portion and end caps comprise a one-piece, boxlike member of double wall construction, and each of said end caps comprising a double wall construction having an outer sidewall extending across the corresponding end of said body portion and around the front and rear thereof, said cover member having a top wall and front and rear walls, said front and rear walls being inwardly offset relative to the front and rear of said end caps.

2. A container comprising a body portion of thermoplastic material, a cover portion including a movable cover member extending lengthwise of said cover portion and terminating short of the opposite ends thereof, and a pair of end caps formed with said body portion as an integral part thereof, said end caps being located adjacent the opposite ends of said cover member to complete said cover portion, wherein said body portion and end caps comprise a one-piece, boxlike member of double wall construction, each of said end caps comprising a double wall construction having an outer sidewall extending across the corresponding end of said body portion and around a portion of the front and rear thereof, an inwardly inclined shoulder extending across the top and along the opposite upstanding edges of said outer sidewall and a generally flat inner wall spaced from said shoulder by a step portion extending across the top and along the opposite upstanding sides of said inner wall, said cover member having top, front and rear walls and having beveled edges extending therealong at opposite ends of said cover member, thereby providing an inwardly offset joint between said cover member and said end caps.

3. A container comprising a body portion of thermoplastic material, a cover portion including a movable cover member extending lengthwise of said cover portion and terminating short of the opposite ends thereof, and a pair of end caps formed with said body portion as an integral part thereof, said end caps being located adjacent the opposite ends of said cover member to complete said cover portion, wherein said end caps are of double wall construction, together with hinge pins carried by said cover member, and hinge pin receiving means in the inner walls of said end caps.

4. A container as set forth in claim 3, wherein said cover member comprises a one-piece construction of substantially transparent thermoplastic material throughout.

5. A container as set forth in claim 3, said container body portion having a front wall portion formed to provide an undercut shouldered portion in spaced relation to said cover member and a cam surface inclined outwardly away from said cover member to approximately the region of said shouldered portion, and a resiliently yieldable latch member carried by said cover member, said latch member extending over said front wall portion and beyond said shouldered portion, said latch member terminating in a latching part inclined inwardly toward said shouldered portion at a first angle when said container is closed, said latching part including a reduced width tongue providing a cam shoulder engageable with said cam surface during closing of said container for springing said tongue away from said front wall portion, said tongue having a tip engageable with said shouldered portion and inclined at a lesser angle than said first angle.

6. A container comprising a body portion of thermoplastic material, a cover portion including a movable cover member extending lengthwise of said cover portion and terminating short of the opposite ends thereof, and a pair of end caps formed with said body portion as an integral part thereof, said end caps being located adjacent the opposite ends of said cover member to complete said cover portion, wherein said body portion and end caps comprise a one-piece, boxlike member and wherein both said body portion and said end caps are of hollow double wall construction.

7. A container as set forth in claim 6, wherein the inner wall of said body portion is formed to provide compartments.

8. A container as set forth in claim 6, wherein said cover member is of one-piece, injection molded construction, and wherein said body portion and end caps together comprise a one-piece, blow-molded construction.

9. A container as set forth in claim 6, wherein said cover member is of inverted, generally channel shape.

10. A container as set forth in claim 9, wherein said cover member is formed to provide strengthening skirts extending across the opposite ends thereof.